United States Patent [19]

Müller et al.

[11] Patent Number: 4,767,573

[45] Date of Patent: Aug. 30, 1988

[54] PROCESS FOR THE PREPARATION OF A MIXTURE OF 1-AMINO-2-CHLORO-4-HYDROXYAN-THRAQUINONE AND 1-AMINO-2-BROMO-4-HYDROXYAN-THRAQUINONE

[75] Inventors: Rolf Müller, Aesch, Switzerland; Bernd Dill, Rheinfelden, Fed. Rep. of Germany

[73] Assignee: Ciba-Geigy Corporation, Ardsley, N.Y.

[21] Appl. No.: 60,712

[22] Filed: Jun. 10, 1987

[30] Foreign Application Priority Data

Jun. 16, 1986 [CH] Switzerland .................. 2421/86

[51] Int. Cl.$^4$ .............................................. C07C 97/26
[52] U.S. Cl. .................................... 260/380; 260/381
[58] Field of Search ................................. 260/380, 381

[56] References Cited

U.S. PATENT DOCUMENTS 3,530,151 9/1970 Hoare ................................. 260/380
4,235,789 11/1980 Stout ................................. 260/380
4,292,247 9/1981 Nishikuri et al. .................. 260/380
4,648,994 3/1987 Müller et al. ...................... 260/380

*Primary Examiner*—Glennon H. Hollrah
*Assistant Examiner*—Raymond Covington
*Attorney, Agent, or Firm*—Kevin T. Mansfield; Edward McC. Roberts

[57] ABSTRACT

A process for the preparation of a mixture of 1-amino-2-chloro-4-hydroxyanthraquinone and 1-amino-2-bromo-4-hydroxyanthraquinone, which mixture contains a high proportion of 1-amino-2-chloro-4-hydroxyanthraquinone, by chlorinating and brominating 1-aminoanthraquinone and reacting the intermediate so obtained with concentrated or fuming sulfuric acid.

11 Claims, No Drawings

PROCESS FOR THE PREPARATION OF A MIXTURE OF 1-AMINO-2-CHLORO-4-HYDROXYANTHRAQUINONE AND 1-AMINO-2-BROMO-4-HYDROXYANTHRAQUINONE

The present invention relates to a process for the preparation of a mixture of 1-amino-2-chloro-4-hydroxyanthraquinone and 1-amino-2-bromo-4-hydroxyanthraquinone, which mixture contains a high proportion of 1-amino-2-chloro-4-hydroxyanthraquinone.

The chlorination of 1-aminoanthraquinone to 1-amino-2,4-dichloroanthraquinone normally results in the formation of by-products, e.g. mono- or trichlorinated compounds. These by-products substantially complicate the isolation of sufficiently pure 1-amino-2,4-dichloroanthraquinone and 1-amino-2-chloro-4-hydroxyanthraquinone, which is required as an important intermediate for the synthesis of dyes, especially disperse dyes. For this reason it is necessary to carry out purifying operations after the chlorination, e.g. filtrations, which, however, result in a loss in yield of about 15 to 20% of theory.

It is therefore the object of the present invention to modify the halogenation of 1-aminoanthraquinone such that the subsequent reaction to give the corresponding 2-halo-4-hydroxyanthraquinone can be carried out without complications and purifying operations in as a high yield as possible.

This object is achieved by treating 1-aminoanthraquinone with chlorine and bromine and reacting the resultant 1-amino-2,4-dihaloanthraquinones, in a second step, with concentrated or fuming sulfuric acid.

Accordingly, the present invention provides a process for the preparation of a mixture of 1-amino-2-chloro-4-hydroxyanthraquinone and 1-amino-2-bromo-4-hydroxyanthraquinone, which mixture contains a high proportion of 1-amino-2-chloro-4-hydroxyanthraquinone, which process comprises chlorinating 1-aminoanthraquinone, in an inert organic solvent, until 60 to 90% of 1-amino-2,4-dichloroanthraquinone is present in the reaction mixture, brominating the resultant reaction mixture until it contains less than 2% of starting material and monohalogenated compound, subsequently reacting the products so obtained with concentrated or fuming sulfuric acid to give 1-amino-2-chloro-4-hydroxyanthraquinone and 1-amino-2-bromo-4-hydroxyanthraquinone, and isolating the mixture so obtained.

Further objects of the invention are the mixtures obtained by the process disclosed herein as well as the use of said mixtures for the synthesis of dyes, and also mixtures per se which contain the mixture of the invention and the use thereof for the synthesis of dyes.

In the process of this invention, 1-aminoanthraquinone is chlorinated until 60 to 90% of 1-amino-2,4-dichloroanthraquinone is present in the reaction mixture (the percentages throughout this specification will be understood as being by weight). This reaction mixture is subsequently brominated until less than 2% of starting material and monohalogenated compound (taken together) are present.

After this halogenation, 90 to 95% of the 1-aminoanthraquinone employed as starting material is in the form of a mixture of 2,4-dihalogenated 1-aminoanthraquinones. These dihalogenated compounds consist of 60 to 90% of 1-a:sino-2,4-dichloroanthraquinone and 10 to 40% of 1-amino-2,4-dibromoanthraquinone and 1-amino-2-bromo-4-chloroanthraquinone.

It has been found that too long a chlorination (when more than 90% of 1-amino-2,4-dichloroanthraquinone is obtained) results in the formation of a high proportion of those by-products which make the further reaction to the desired 4-hydroxy compound and its purification very complicated and lead to losses in yield. A further chlorination is therefore to be avoided.

The reaction of the dihalogenated compound with the strong acid can be carried out direct in the reaction mixture obtained after the halogenation. However, it is also possible to isolate the dihalogenated compounds before reacting them with the strong acid. In both of these variants, the reaction proceeds in 95 to 98% yield to give a mixture of the corresponding 1-amino-2-halo-4-hydroxyanthraquinones, with the proportion of 1-amino-2-chloro-4-hydroxyanthraquinone in this mixture being 60 to 90% and that of 1-amino-2-bromo4-hydroxyanthraquinone being 10 to 40%.

In the conventional processes, the yield of 1-amino-2,4-dichloroanthraquinone after the chlorination is c. 87% in more than 95% purity. The subsequent step affords 1-amino-2-chloro-4-hydroxyanthraquinone in a yield of c. 87% in more than 95% purity. Thus only about 73% (based on 1-aminoanthraquinone) of this compound in more than 95% purity is available for further synthesis to a dye.

In the process of this invention, however, the yield of intermediate is substantially increased. The bromination following the chlorination increases to 93% the yield of 1-amino-2,4-dihaloanthraquinone, which can be readily further reacted in the second step in 96% yield. Thus 1-amino-2-chloro-4-hydrdoxyanthraquinone and 1-amino-2-bromo-4-hydroxyanthraquinone are obtained in a total yield of 89% in more than 95% purity and can then be used for dye synthesis.

Although the exclusive bromination to give 1-amino-2-bromo-4-hydroxyanthraquinone affords comparably high yields, only a very small number of dyes can be synthesised therewith in a form suitable for dyeing purposes.

Accordingly, the process of this invention provides a means of preparing the desired intermediate in very much simpler manner and in substantially higher yield than hitherto. It is thus possible to synthesise a large number of dyes, for example those of formula

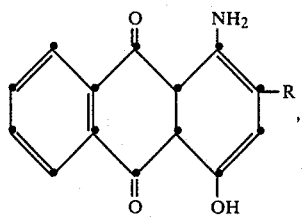

wherein R is e.g. —OCH$_2$CH$_2$OH, —(OCH$_2$CH$_2$)$_{1,2}$—OCH$_3$, —(OCH$_2$CH$_2$)$_{1,2}$—OC$_6$H$_5$, —(OCH$_2$CH$_2$)$_{1,2}$—CN, —SCH$_2$CH$_2$OH, —OC$_6$H$_5$, —OC$_6$H$_4$Cl, —OC$_6$H$_4$OH, —OC$_6$H$_4$Br, —OC$_6$H$_4$SO$_2$HNCH$_2$CH$_2$Ch$_2$OCH$_2$CH$_3$, —OCH$_2$CH$_2$OC$_6$H$_5$, —OC$_6$H$_4$SCH$_3$, —OC$_6$H$_4$OCH$_3$, —OC$_6$H$_4$C$_{10}$H$_{21}$, —OC$_6$H$_4$OSO$_2$C$_6$H$_4$CH$_3$, —OCH$_2$CH$_2$OCONHC$_6$H$_5$, —OC$_6$H$_4$CH$_2$NHCO$_2$C$_3$H$_7$,

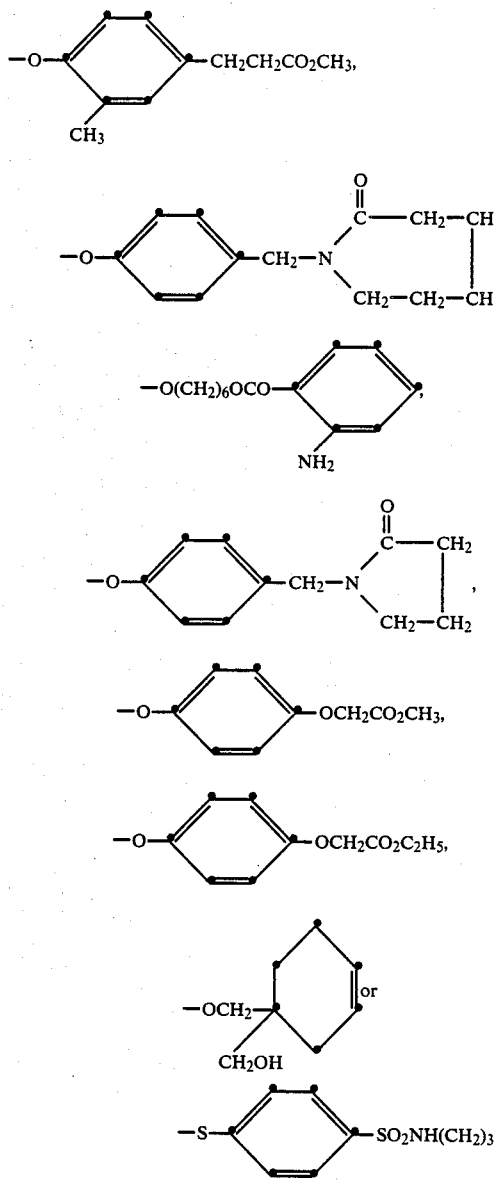

In a preferred embodiment of the present invention the products formed after the bromination are isolated and reacted, in a separate reaction step, with the concentrated or fuming sulfuric acid.

Another preferred embodiment of the invention comprises carrying out the bromination simultaneously with the chlorination. In this process 1.2 to 2.5 moles of chlorine and 0.05 to 0.5 mole of bromine are used per mole of 1-aminoanthraquinone.

Yet another preferred embodiment of the invention comprises extracting the 2,4-dihalogenated compounds present in the reaction mixture after the halogenation with the said strong acid and then reacting the intermediate, in the acid phase so obtained, to give the corresponding 2-halo-4-hydroxy compounds. The advantage of this procedure is e.g. that the steps of isolating and drying the dihalogenated compounds after the halogenation step can be dispensed with.

The halogenation of 1-aminoanthraquinone is carried out in an inert organic solvent suitable for liquid phase chlorination and bromination reactions, e.g. toluene, xylene, mono-, di- or trichlorobenzene, nitrobenzene, dimethylformamide, acetic acid, trifluoroacetic acid, or a mixture of such solvents. The reaction temperature is preferably in the range from 50° to 150° C., most preferably from 100° to 105° C.

The chlorination can be carried out under normal pressure as well as under excess or reduced pressure. It is preferred to carry out the chlorination under normal pressure. Liquid or gaseous chlorine may be used in the chlorination. Gaseous chlorine can be introduced above as well as below the surface of the organic solution of 1-aminoanthraquinone.

Bromine is employed in the form of a solution in one of the solvents referred to above or, preferably, in elemental form.

If desired, the chlorination and bromination are carried out in the presence of a catalyst conventionally employed in aromatic substitution reactions, e.g. iodine, or aluminium, iron or antimony chloride.

The halogenation of this invention can be carried out batchwise, e.g. in a stirred reactor, or continuously by the known countercurrent principle by trickling 1-aminoanthraquinone e.g. over Rasching rings, which may be made of iron, and introducing chlorine in countercurrent.

After the halogenation, the resultant products are extracted or isolated. Isolation can be effected by conventional methods such as steam distillation or concentration of the reaction solution.

The dry products are then treated with the concentrated or fuming, preferably 95 to 110%, sulfuric acid. This is done by adding the products to the strong acid and heating the mixture to a temperature of preferably 80° to 160° C., most preferably from 100° to 140° C. The reaction is conveniently carried out in the presence of boric acid, boron trioxide or an aldehyde.

If the products formed in the halogenation step of the process of this invention are extracted direct from the organic solvent with the strong acid, then the reaction conditions cited above for the reaction of the isolated dry products with the strong acid apply to the further reaction of said products in the resultant acid phase. This is illustrated in Example 5.

The mixture of 60 to 90% of 1-amino-2-chloro-4-hydroxyanthraquinone and 10 to 40% of 1-amino-2-bromo-4-hydroxyanthraquinone obtained according to this invention is then isolated in conventional manner, e.g. by precipitation with water, and dried.

It must also be mentioned that the mixtures obtained by the process of this invention can also be obtained by mixing 60 to 90% of 1-amino-2,4-dichloroanthraquinone and 10 to 40% of 1-amino-2,4-dibromoanthraquinone and 1-amino-2-bromo-4-chloroanthraquinone, and reacting this mixture with the strong acid as described above, as well as direct by mixing 60 to 90% of 1-amino-2-chloro-4-hydroxyanthraquinone and 10 to 40% of 1-amino-2-bromo-4-hydroxyanthraquinone.

The invention is illustrated by the following Examples, without implying any limitation to what is described therein. Unless otherwise indicated, parts and percentages are by weight.

EXAMPLE 1

111.5 parts of 1-aminoanthraquinone in 461 parts of chlorobenzene are heated to 10°–103° C. Then 78.1 parts of chlorine gas are introduced above the surface of the solution over 3 hours at the same temperature.

When the addition of chlorine is complete, 48 parts of bromine are added dropwise over 1 hour and the reaction mixture is stirred for 1 hour at 100° C. and then cooled to 50° C. The crystalline suspension is subjected to steam distillation and the product is isolated by filtration, washed and dried, affording 149.6 parts of a mixture comprising 74.2% of 1-amino-2,4-dichloroanthraquinone, 11.5% of 1-amino-2-bromo-4-chloroanthraquinone and 6.6% of 1-amino-2,4-dibromoanthraquinone. The yield of desired compounds is 92% of theory.

A mixture of 610 parts of fuming (108%) sulfuric acid and 41.5 parts of boron trioxide is heated to 60° C. As soon as a solution has formed, 149.6 parts of the 1-amino-2,4-dihaloanthraquinone mixture are added over ¼ hour at the same temperature. While introducing nitrogen at a rate of 10–20 l/h, the batch is heated for 1 hour at 100° C. and for 20 to 30 minutes at 137°–140° C. When the reaction is complete, the reaction mixture is cooled to 70° C. and 415 parts of water are added dropwise at 70°–90° C. over 20 to 30 minutes. After stirring for 1 hour at 137°–140° C., the precipitated product is isolated by filtration at 50° C. The filter residue is washed with 500 parts of 60% sulfuric acid and then with water until neutral, and dried. Yield: 132.7 parts of 1-amino-2-chloro/bromo-4-hydroxyanthraquinone. This mixture consists of 78.2% of 1-amino-2-chloro-4-hydroxyanthraquinone and 11.7% of 1-amino-2-bromo-4-hydroxyanthraquinone and corresponds to a yield of 95.4% of theory. The total yield is thus 85.6% of theory.

EXAMPLE 2

111.5 parts of 1-aminoanthraquinone in 461 parts of chlorobenzene are heated to 100°–103° C. Then 74.6 parts of chlorine gas are introduced above the surface of the solution, while simultaneously adding 8.0 parts of bromine. The reaction mixture is stirred for 1 hour at 100° C. and subjected to steam distillation. The product is isolated by filtration, washed and dried, affording 149.3 parts of a mixture comprising 73.0% of 1-amino-2,4-dichloroanthraquinone, 16.1% of 1-amino-2-bromo-4-chloroanthraquinone and 1.4% of 1-amino-2,4-dibromoanthraquinone, corresponding to a yield of desired compounds of 90.1% of theory.

148.2 parts of the above mixture are then reacted with concentrated sulfuric acid and boron trioxide as described in Example 1, to give 130.8 parts of a mixture comprising 81.6% of 1-amino-2-chloro-4-hydroxyanthraquinone and 10.5% of 1-amino-2-bromo-4-hydroxyanthraquinone. This corresponds to a yield of 96.8% of theory and to a total yield of 86.6% of theory.

EXAMPLE 3

(Comparison Example)

111.5 parts of 1-aminoanthraquinone in 460 parts of chlorobenzene are heated to 100°–103° C. Then 85.2 parts of chlorine gas are introduced above the surface of the solution over 4 hours. Then 50 parts of chlorobenzene are distilled off, the distillate is cooled to room temperature, and the precipitated product is isolated by filtration. The filter residue is washed with 150 parts of chlorobenzene, then with methanol and water, and dried, affording 121.4 parts of 1-amino-2,4-dichloroanthraquinone in more than 95% purity, corresponding to a yield of 83.1% of theory.

120.3 parts of this product are reacted with concentrated sulfuric acid and boron trioxide as described in Example 1, affording 98.8 parts of 1-amino-2-chloro-4-hydroxyanthraquinone in more than 95% purity. This corresponds to a yield of 87.6% of theory and thus to a total yield of 68.7% of theory.

EXAMPLE 4

(Comparison Example)

140 parts of 1-aminoanthraquinone are added to 700 parts of o-dichlorobenzene. The mixture is heated to 100°–103° C. and then, after 30 minutes, 112.4 parts of chlorine gas are introduced above the surface of the solution over 3 hours. Then 130 parts of o-dichlorobenzene are removed by distillation. The reaction mixture is cooled to room temperature and poured into 340 parts of 100% sulfuric acid. The batch is stirred for 1 hour and the o-dichlorobenzene phase is then separated. To the sulfuric acid phase, which contains 1-amino-2,4-dichloroanthraquinone, is added a solution of 68 parts of boric acid in 307 parts of 25% oleum over 10 minutes such that the temperature does not exceed 60°–65° C. The batch is then heated for 1 hour to 100° C. and stirred at this temperature for 1 hour. The temperature is then raised to 137° C. over 1 hour and the reaction mixture is kept for 3 hours at 137°–140° C. and subsequently cooled to 110° C. 480 parts of water are added such that the temperature of the mixture is about 130° C. when the addition is complete. The reaction mixture is then cooled to 50° C., stirred for 2 hours at 50°–55° C. and filtered at 50° C. The filter product is washed with 400 parts of sulfuric acid and suspended in 1600 parts of water. The suspension is stirred for 2 hours at 90°–95° C. and then filtered at 50° C. The filter residue is washed with warm water and vacuum dried at 90°–100° C., to give 136.7 g (75.7% of theory) of 1-amino-2-chloro-4-hydroxyanthraquinone in 95% purity.

EXAMPLE 5

111.5 parts of 1-aminoanthraquinone are added to 660 parts of o-dichlorobenzene. The mixture is heated to 100°–103° C. and then 74.6 parts of chlorine gas are introduced above the surface of the solution. When the addition of chlorine is complete, 8 parts of bromine are added. The reaction mixture is stirred for 1 hour at 100° C., allowed to cool to room temperature, and then 548 parts of 100% sulfuric acid are added dropwise at 20°–30° C. over 30 minutes. The batch is stirred for 1 hour and the o-dichlorobenzene phase is then separated. Then 72.5 parts of 66% oleum are added to the sulfuric acid phase, which contains a mixture of 1-amino-2,4-dichloroanthraquinone, 1-amino-2-bromo-4-chloroanthraquinone and 1-amino-2,4-dibromoanthraquinone, to give an oleum concentration of c. 7%, and then 52.4 parts of boric acid are added such that the temperature does not exceed 60° C. The reaction mixture is then heated for 1 hour to 100° C. and stirred for 1 hour at this temperature. The temperature is then raised to 137°–140° C. over 30 minutes. The reaction mixture is stirred for 3 hours at this temperature and then cooled to 110° C. 431 parts of water are then added such that the temperature of the mixture is about 130° C. and the concentration of sulfuric acid is about 60%. After stirring for 1 hour at 130° C., the reaction mixture is cooled to 50° C. and filtered at this temperature. The filter residue is washed with 300 parts of 60% sulfuric acid then with water, and vacuum dried at 90°–100° C., to give 125.7 parts of a mixture comprising 86.7% of 1-amino-2-chloro-4-hydroxyanthraquinone and 7.3% of 1-amino-2-bromo-4-hydroxyanthraquinone. This corresponds to a yield of 85.5% of theory.

EXAMPLE 6

28.2 parts of the 1-amino-2-chloro/bromo-4-hydroxyanthraquinone obtained according to Example 5 are added to 80 parts of 1,3-butanediol. Then 10.5 parts of phenol and 11.3 parts of anhydrous potassium carbonate are added. The batch is then heated to 120° C. and stirred for 2 hours at this temperature while introducing nitrogen at a rate of 10 l/h. The temperature is raised to 140°–145° C. and stirring is continued for 4 hours while blanketing with nitrogen. The batch is cooled to 80°–90° C. and 182 parts of water are added dropwise over about 15 minutes. The mixture is stirred at 80°–85° C., cooled to about 25° C., and the pH is then adjusted to 8.5 with 60% sulfuric acid. The precipitated product is filtered over a cotton filter and washed with a mixture of 28 parts of methanol and 39 parts of water and finally with water of 50°–60° C. until the washings are colourless and have a neutral pH. The filter cake is vacuum dried at 80° C., affording 28 parts of a dye which dyes polyester fibres in a brilliant red shade. Yield: 89.3% of theory.

What is claimed is:

1. A process for the preparation of a mixture of 1-amino-2-chloro-4-hydroxyanthraquinone and 1-amino-2-bromo-4-hydroxyanthraquinone, which mixture contains a high proportion of 1-amino-2-chloro-4-hydroxyanthraquinone, which process comprises chlorinating 1-aminoanthraquinone, in an inert organic solvent, until 60 to 90% of 1-amino-2,4-dichloroanthraquinone is present in the reaction mixture, brominating the resultant reaction mixture until it contains less than 2% of starting material and monohalogenated compound, subsequently reacting the products so obtained with concentrated or fuming sulfuric acid to give 1-amino-2-chloro-4-hydroxyanthraquinone and 1-amino-2-bromo-4-hydroxyanthraquinone, and isolating the mixture so obtained.

2. A process according to claim 1, which comprises isolating the products formed after the bromination and reacting them, in a separate reaction step, with the concentrated or fuming sulfuric acid.

3. A process according to claim 1, which comprises carrying out the chlorination and bromination simultaneously, using 1.2 to 2.5 moles of chlorine and 0.05 to 0.5 mole of bromine per mole of 1-aminoanthraquinone.

4. A process according to claim 1, which comprises extracting the products with the sulfuric acid and reacting them, in the sulfuric acid phase, direct to 1-amino-2-chloro-4-hydroxyanthraquinone and 1-amino-2-bromo-4-hydroxyanthraquinone.

5. A process according to claim 1, wherein the chlorination and bromination are carried out in the temperature range from 50° to 150° C.

6. A process according to claim 5, wherein the chlorination and bromination are carried out in the temperature range from 100° to 105° C.

7. A process according to claim 1, wherein the reaction with sulfuric acid is carried out in the temperature range from 80° to 160° C.

8. A process according to claim 7, wherein the reaction with sulfuric acid is carried out in the temperature range from 100° to 140° C.

9. A process according to claim 1, wherein the reaction with sulfuric acid is carried out in the presence of boric acid, boron trioxide or aldehydes.

10. A process according to claim 1, wherein the inert organic solvent is toluene, xylene, mono-, di- or trichlorobenzene, nitrobenzene, dimethylformamide, acetic acid or trifluoroacetic acid, or a mixture of said solvents.

11. A process according to claim 10, wherein the inert organic solvent is toluene, xylene, mono-, di- or trichlorobenzene, nitrobenzene, dimethylformamide, or a mixture of said solvents.

* * * * *